UNITED STATES PATENT OFFICE.

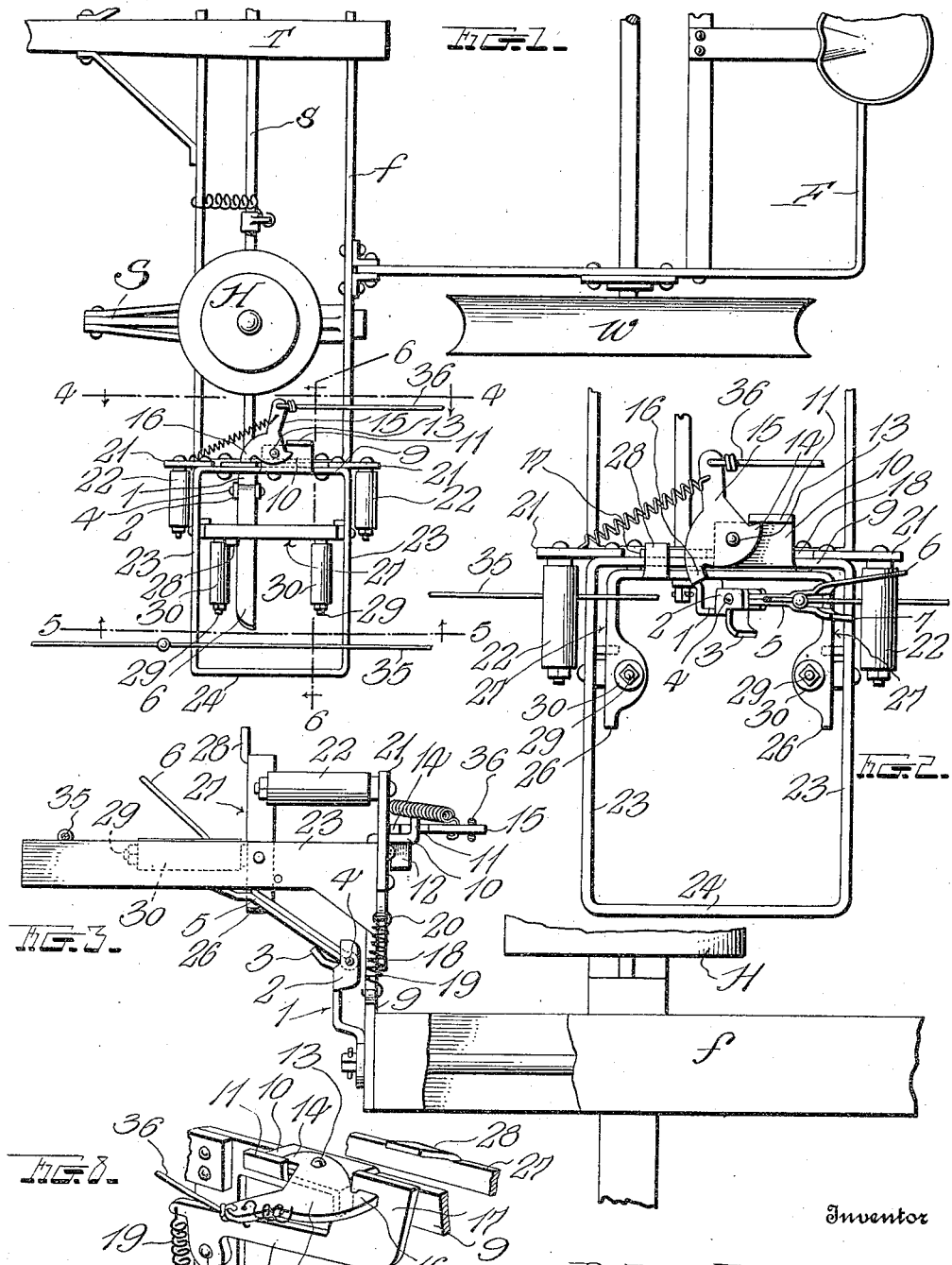

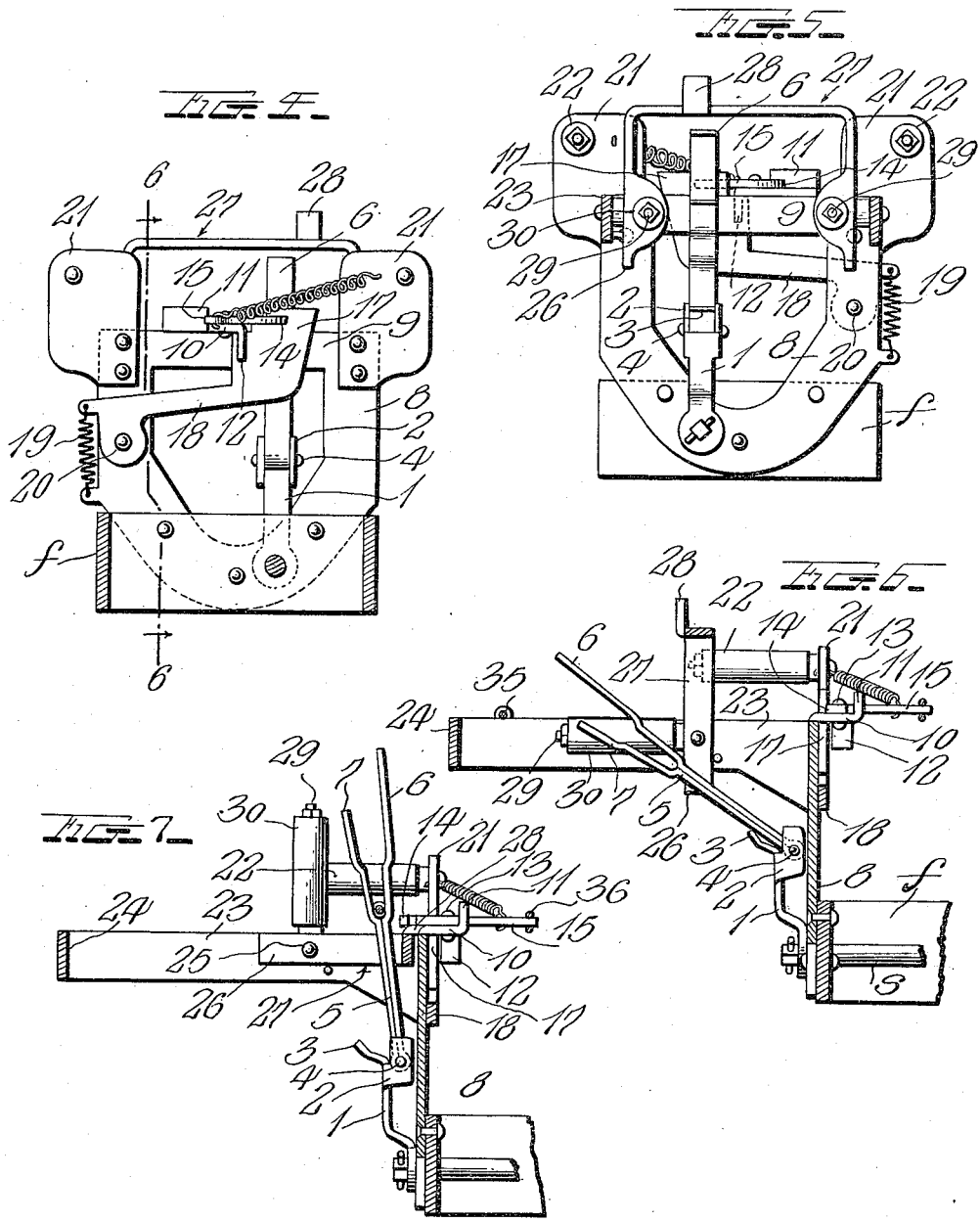

ROLLA E. MUDD, OF STRONGHURST, ILLINOIS, ASSIGNOR OF ONE-HALF TO GEORGE DIXSON, DELBERT DIXSON, AND WILLIAM C. IVINS, OF STRONGHURST, ILLINOIS.

CHECK-ROW CORN-PLANTER.

1,175,072.  Specification of Letters Patent.  Patented Mar. 14, 1916.

Application filed November 9, 1914. Serial No. 871,080.

*To all whom it may concern:*

Be it known that I, ROLLA E. MUDD, a citizen of the United States, residing at Stronghurst, in the county of Henderson and State of Illinois, have invented certain new and useful Improvements in Check-Row Corn-Planters; and I do declare the following to be a full, clear, and exact description of the invention, such as will enable others skilled in the art to which it appertains to make and use the same.

My invention relates broadly to improvements in agricultural implements, and more particularly to check row corn planters. It is a well known fact that with most forms of corn planters of this type, some form of wire guide is employed, and a fork is mounted to be rocked rearwardly adjacent said guide, this fork intermittently rocking a shaft to drop seed from the planter, and that a check wire is employed for rocking the fork at intervals.

It is the main object of the invention to provide a simple and efficient structure whereby the check wire may be readily moved into its guiding means, held therein, and removed therefrom.

In carrying out the above object, a laterally swinging member is employed for retaining the wire within the guiding means therefor, and for removing said wire from said means, a normally projected catch being provided for retaining the member in active position.

A further object of the invention is to provide a "kicker" and a spring for projecting the same, said kicker being normally held retracted against the tension of its spring, by said catch, by being adapted to be forced into contact with a portion of the retaining member to move the same to inactive position, when the catch is released.

Yet another object of the invention is to construct the device in such a manner as to cause the kicker to be automatically moved to inactive position, when the retaining member is swung to its active position, and likewise to construct the catch in such a manner as to cause it to be moved to operative position when the above mentioned movement of parts takes place.

With the above and minor objects in view, the invention resides in certain novel features of construction and combination herein described and claimed and shown in the drawings wherein:

Figure 1 is a top plan view of a portion of a corn planter constructed in accordance with my invention; Fig. 2 is a similar view of a portion thereof, showing a different positioning of parts; Fig. 3 is a rear side view of a portion of the hopper frame of the planter, and the extension frame secured thereto; Figs. 4 and 5 are detail vertical longitudinal sections as seen on the lines 4—4 and 5—5 of Fig. 1, looking in the directions indicated by the arrows; Fig. 6 is a vertical transverse section as seen on the line 6—6 of Fig. 1, with the retaining member in inactive position, and with the parts in position to receive the check wire; Fig. 7 is a similar view with the retaining member in operative position, showing the wire properly located within the fork, and Fig. 8 is a perspective detail showing more particularly the construction of the catch mechanism and the kicker.

In the accompanying illustration, a portion of the main frame F of a corn planter is shown, said frame being supported by the usual type of wheels W, and being pivoted at its forward end to a transverse hopper frame $f$ which carries a pair of hoppers H, seed shoes S, and transverse rock shaft $s$, said frame $f$ being provided with a tongue T, as is common with devices of this character. The shaft $s$ operates seed dropping mechanism (not shown) located in the bottoms of the hoppers H, and is adapted to be intermittently rocked, in order to operate said mechanism. The shaft $s$ is continued a slight distance past each end of the hopper frame $f$, but since the construction at both ends of this frame is identical, but one end is shown.

Rising from the end of the shaft $s$, is a crank arm 1 whose upper end is provided with a pair of spaced flanges 2 which are bent laterally inward, and with a stop 3 which extends laterally outward, a pivot pin 4 being passed through the two flanges 2 and through a knuckle on the lower end of the shank of a fork 5. This fork 5, when in operative position, stands in a substantially upright position, and is provided on its inner side, with a comparatively long arm 6, while its other arm 7, is comparatively short, this structure being provided for a purpose to be set forth.

Secured by any suitable means to the end of the frame f is an upright attaching frame 8 which includes a U-shaped member whose arched connecting bar is secured to the frame f, and a cross bar 9 which lies in a horizontal plane and which connects the arms of the U-shaped member. Bent laterally inward from the upper edge of the bar 9, is a flange 10 whose inner edge is provided with an upright stop flange 11, while its forward end is bent downwardly to provide a stop 12. Pivoted at 13 upon the flange 10 and having a nose 14 coacting with the flange 11 thereof, is a spring projected catch 15 whose active end 16 is normally thrown outwardly past the bar 9 to the position seen in Fig. 2, in which position the nose 14 prevents further movement. With the catch 15 in the position just described, the foot 17 of a kicker 18 contacts with the under side of said catch, and is thereby held in a lowered or retracted position against the tension of a rather stiff spring 19 which tends to rock the foot 17 upwardly around the pivot 20 of the kicker. By reference to the various figures of the drawing, it will be seen that the foot 17 is mounted for vertical sliding movement between the stop 12 and the bar 9, whereby it is guided in its movement.

Projecting forwardly and rearwardly from the opposite ends of the bar 9, are front and rear brackets 21 from which spindles project laterally outward, said spindles revolubly supporting guide rollers 22 which are spaced in a plane above a pair of parallel laterally extending wire supporting bars 23 whose inner ends are secured to the opposite ends of the bar 9, while their outer ends are united by a transverse bar 24. The bars 9, 23, and 24, constitute the extension frame hereinbefore mentioned.

Pivoted at 25 to the inner sides of the bars 23, is a pair of arms 26 of a U-shaped frame 27 whose cross bar is provided with an extension 28 which, when the frame is in its normal horizontal position, as seen in Fig. 2, contacts with the foot 17 which is now depressed, and which is adapted to strike said foot to depress the same, when said frame is rocked to its normal position, in a manner to be set forth. This extension 28 also constitutes the portion of the frame 27 which is kicked by the kicker 18.

Rising from the outer end portions of the arms 26, and preferably from the axis upon which said arms are pivoted, is a pair of upright spindles 29 upon which a pair of guide rollers 30 are revolubly mounted, these rollers normally preventing the check wire 35 from moving outwardly when it is positioned within the fork, as seen in Figs. 2 and 7, and being held in this position, by the catch 15 which is now swung outwardly above the transverse bar of the U-shaped frame 27, as clearly seen in the first named figure.

With the parts standing as seen in Figs. 2 and 7, should it be desired to remove the check wire 35, the catch 15 is released or retracted by a suitable operating element 36 which may lead to an appropriate part of the planter, whereupon the transverse bar of the frame 27 will be free to rise, and whereupon the kicker 18 is released, its spring 19 now forcing its foot 17 upwardly into forcible contact with the extension 28. The result is that the entire U-shaped frame and the rollers 30 carried thereby, are moved from the position seen in Fig. 7 to that seen in Fig. 6, during which movement the arms 26 contact with the wire 35, thereby moving it outwardly and also swinging the fork outwardly to the position seen in Fig. 6.

From the foregoing, it will be seen that comparatively simple structure has been provided whereby the check wire 35 may be quickly and effectively thrown to inoperative position, in case it should become necessary. This structure likewise becomes efficient when replacing the wire 35, since the long arm 6 of the fork now stands as seen in Fig. 6, or, in other words, the plane in which the upper edges of the bars 23 lie, intersects the space between the arms 6 and 7, as clearly shown in this figure. The rollers 30 now lie in a horizontal plane, while the U-shaped frame 27 stands vertically. The wire 35 may now be forced inwardly upon the wire supporting bars 23 into the fork, farther inward movement of the wire now rocking said fork inwardly and causing said wire to contact with the arms 26 of the frame 27, thereby again returning said frame to its normal horizontal position and moving the fork to its normal upright position (see Fig. 7). In swinging to its normal position, however, the extension 28 on the frame 27 contacts with the foot of the kicker 18, said foot now standing in raised position, and depresses the same to allow the spring of the catch 15 to again move said catch to its normal position. The machine is now again ready for operation, and may be propelled across the field without interruption, until it again becomes necessary to remove the wire 35. This necessity always occurs at the ends of the rows planted, it being, therefore, seen that an efficient device has been provided which will greatly decrease the amount of labor necessary in removing and replacing the wire.

I claim:

1. The combination with the frame of a corn planter, and a transverse shaft thereon adapted to be intermittently rocked, of a pair of wire supporting bars projecting laterally outward from said frame, a fork rising from the shaft between the bars and hinged to said shaft to swing outwardly, a stop for limiting the outward movement of said fork to the position in which the space between the arms thereof lies in the same plane in which the upper edges of said bars lie, whereby a wire resting upon the latter may be moved inwardly into said fork, thereby swinging the latter inwardly, a normally horizontal U-shaped frame having its arms pivoted to the inner sides of said bars, a pair of spindles rising from said arms, and releasable means for retaining said frame in its horizontal position, in which position it underlies the wire, and the rollers prevent outward movement of the latter.

2. A corn planter including wire guiding means, a pivoted laterally swinging member for retaining a wire within said means when swung to one position, and for removing said wire when swung to another position, a releasable catch for retaining said member in active position, and a spring projected kicker held normally retracted by said catch when the latter is projected, said kicker being adapted to throw the retaining member to a position to remove said wire, when the catch is released.

3. A corn planter including wire guiding means, releasable means for retaining a wire therein, a laterally swinging member for removing said wire when the retaining means is released, and a kicker for forcing said wire removing member outwardly when said retaining means is released.

In testimony whereof I have hereunto set my hand in presence of two subscribing witnesses.

ROLLA E. MUDD.

Witnesses:
W. C. IVINS,
D. DIXSON.

Copies of this patent may be obtained for five cents each, by addressing the "Commissioner of Patents, Washington, D. C."